United States Patent Office 3,033,839
Patented May 8, 1962

3,033,839
POLYMERIZATION OF VINYL CHLORIDE IN AQUEOUS SUSPENSION
Joseph Heckmaier and Hans Bauer, Burghausen, Germany, assignors to Wacker-Chemie G.m.b.H., Munich, Germany, a German firm
No Drawing. Filed May 5, 1959, Ser. No. 811,012
Claims priority, application Germany May 9, 1958
2 Claims. (Cl. 260—87.1)

It has frequently been observed that during the suspension polymerization of vinyl chloride and during the suspension polymerization of mixtures of vinyl chloride and unsaturated monomers copolymerizable therewith to form copolymers, and especially when the polymerization is carried out with only rather small amounts of a protective colloid being present, polymer particles are obtained which when examined under a microscope present a somewhat glassy surface appearance. Polymers having this type of surface are quite unsuitable for many purposes. For one thing this surface characteristic is related to an undesirable high bulking weight and for another polymers which have this typical surface appearance do not absorb the usual plasticizing agents very readily. This latter property is responsible for the presence of residual plasticizer and the fact that unabsorbed plasticizer is present tends to lessen and impair the flow characteristics or plasticity of the polymer which makes it unsatisfactory for many purposes.

The formation of these smooth particles where the surface is somewhat glassy is encountered particularly in the case of those polyvinyl chloride polymers which have a lower K-value, and is particularly true in the case of those polyvinyl chloride polymers which find the widest application at the present time, namely, those which have a K-value of about 70 as measured by the method of Fikentscher.

Heretofore, in order to obtain a polymer having a relatively low K-value and free of these smooth glassy particles, as well as a relatively low bulking weight it was necessary to carry the polymerization only to the point where about 40% to 60% of the monomer present has undergone polymerization. Such a process is quite uneconomical since it requires equipment of rather large capacity which at best is only partially effective due to the limited capacity which is actually utilized in producing the desired polymer.

It has now been found that polyvinyl chloride and copolymers of vinyl chloride with unsaturated monomers copolymerizable therewith may be obtained free of the foregoing defects and disadvantages if the polymerization is carried out in a plurality of stages in which the temperature differs during each stage. A temperature differential of from 5° C. to 35° C. should be maintained between the respective stages. Most advantageously, the polymerization process of this invention is carried out at a higher initial temperature and the temperature is then reduced in the subsequent polymerization stage. It is preferable, if a polymer of optimum processing characteristics is to be obtained, that the polymerization temperature be altered before more than 50% of the monomer present has been polymerized. The polymers obtained by this process not only have a desirably low K-value but they also have a low bulking weight and are free of particles having a smooth glassy surface.

As mentioned above, the process of this invention may be employed for the production of vinyl chloride polymers and also for the production of copolymers of vinyl chloride and other monomers copolymerizable with vinyl chloride. As examples of such monomers which may be copolymerized with vinyl chloride there may be mentioned vinyl acetate, vinyl propionate, vinyl butyrate, vinyl laurate, vinylidene chloride, acrylonitrile, ethylethacrylate, methylmethacrylate, methylalpha - chloroacrylate, maleic acid, fumaric acid, diethylmaleate and diethylfumarate.

Most advantageously, the initial polymerization is carried out at a temperature of from 45° C. to 65° C. and the subsequent polymerization at which polymerization is completed is carried out at a temperature which is 5° C. to 35° C. below this temperature. The usual peroxide polymerization catalysts employed in the aqueous suspension polymerization of vinyl chloride are satisfactory for use in the present process. The present process comprises a modification of prior art polymerization processes wherein the polymerization is carried out in distinct stages in which a temperature gradient is maintained between the stages of from 5° C. to 35° C.

In order further to illustrate this invention, the following examples are given:

*Example 1*

7,000 kilos of water containing 0.1% by weight of methyl cellulose as a protective colloid are introduced into an autoclave equipped with a stirrer and, after all of the oxygen has been displaced, 3,500 kilos of vinyl chloride are added as well as 3.5 kilos of dilaurolylperoxide as catalyst. Polymerization is effected at a temperature of 58° C. for 9 hours until about 45% of the monomer has been polymerized to polyvinyl chloride. The temperature is then reduced to 39° C. and polymerization is continued until about 90% of the monomer is polymerized to form polyvinyl chloride. The polymer which precipitates has a K-value of 70 by the method of Fikentscher and the polymer particles formed are found to be quite free of those having a smooth, glassy surface. The polymer particles have a bulking weight of 49 grams per 100 cubic centimeters. When the process described above is carried out without reducing the temperature below 53° C., about 40% by weight of the polymer particles formed are quite smooth and have glassy surfaces and the bulking weight of the polymer is 54.3 grams per 100 cubic centimeters. When the respective polymers are processed on calender rolls to form a thin clear film, the film formed from the polyvinyl chloride obtained by the process in which the polymerization temperature is reduced to 39° C. when the polymerization is completed is substantially free of those defects in the film transparency which tend to diffract the light unevenly and to give localized bright spots, a defect which is quite common in films formed of polyvinyl chloride which has been polymerized in a polymerization medium maintained at a uniform temperature.

*Example 2*

150 kilos of water containing 0.1% by weight of polyvinyl alcohol as a protective colloid are charged into a stirring autoclave, the air displaced by nitrogen and then 65 kilos of vinyl chloride and 2.36 kilos of vinyl laurate are added. 100 grams of dilauroylperoxide are employed as the polymerization catalyst. Polymerization is carried out at 58° C. until about 45% of the monomer has been polymerized and the temperature is then reduced to 39° C. and the polymerization continued until an appreciable pressure drop takes place in the autoclave. The surface of the individual polymer particles which precipitate is noticeable irregular and is best described as being snowball-like in appearance. A polyvinyl chloride prepared in the manner described but at a polymerization temperature no lower than 53° C. is found to be composed of particles which have a smooth, glassy surface.

*Example 3*

The same starting mixture as employed in Example 2 is charged into a stirring autoclave with the exception that instead of 2.36 kilos of vinyl laurate the same amount of vinyl acetate is used. Polymerization is carried out at 45° C. until 45% of the monomer has been polymerized and the temperature is then reduced to 35° C. and the polymerization continued until 90% of the monomer has been polymerized. The obtained polymer contains only few glassy particles, whereas when operating at a continuous temperature of 45° C. a product containing about 50% of glassy particles is obtained.

We claim:

1. In a process for the production of vinyl chloride polymers including polyvinyl chloride, and copolymers of vinyl chloride with an unsaturated monomer copolymerizable therewith by polymerization in an aqueous suspension polymerization medium, the steps which comprise initiating the polymerization in an aqueous suspension polymerization of the monomer system consisting of the monomer, a monomer-soluble peroxide polymerization catalyst and a protective colloid selected from the group consisting of methyl cellulose and polyvinyl alcohol as the sole active components at a temperature of from 45° C. to 65° C., continuing the polymerization at said temperature until about 45% of the monomer present has been polymerized, then lowering the temperature of the aqueous polymerization medium from 5° C. to 35° C. below the initial polymerization temperature but maintaining it above the freezing point, and completing the aqueous suspension polymerization at said lower temperature.

2. Process for the production of polyvinyl chloride of improved properties, which comprises initiating the polymerization of a vinyl chloride monomer in an aqueous suspension polymerization medium consisting of the monomer, a monomer-soluble peroxide polymerization catalyst and a protective colloid selected from the group consisting of methyl cellulose and polyvinyl alcohol as the sole active components at a temperature of from 45° C. to 65° C., continuing the polymerization until about 45% of the monomer present has been polymerized, then lowering the temperature of the aqueous polymerization medium from 5° C. to 35° C. below the initial polymerization temperature but maintaining it above the freezing point, and completing the aqueous suspension polymerization at said lower temperature.

References Cited in the file of this patent

UNITED STATES PATENTS

| | | |
|---|---|---|
| 2,259,180 | Schoenfeld et al. | Oct. 14, 1941 |
| 2,395,344 | Schoenfeld | Feb. 16, 1946 |